UNITED STATES PATENT OFFICE.

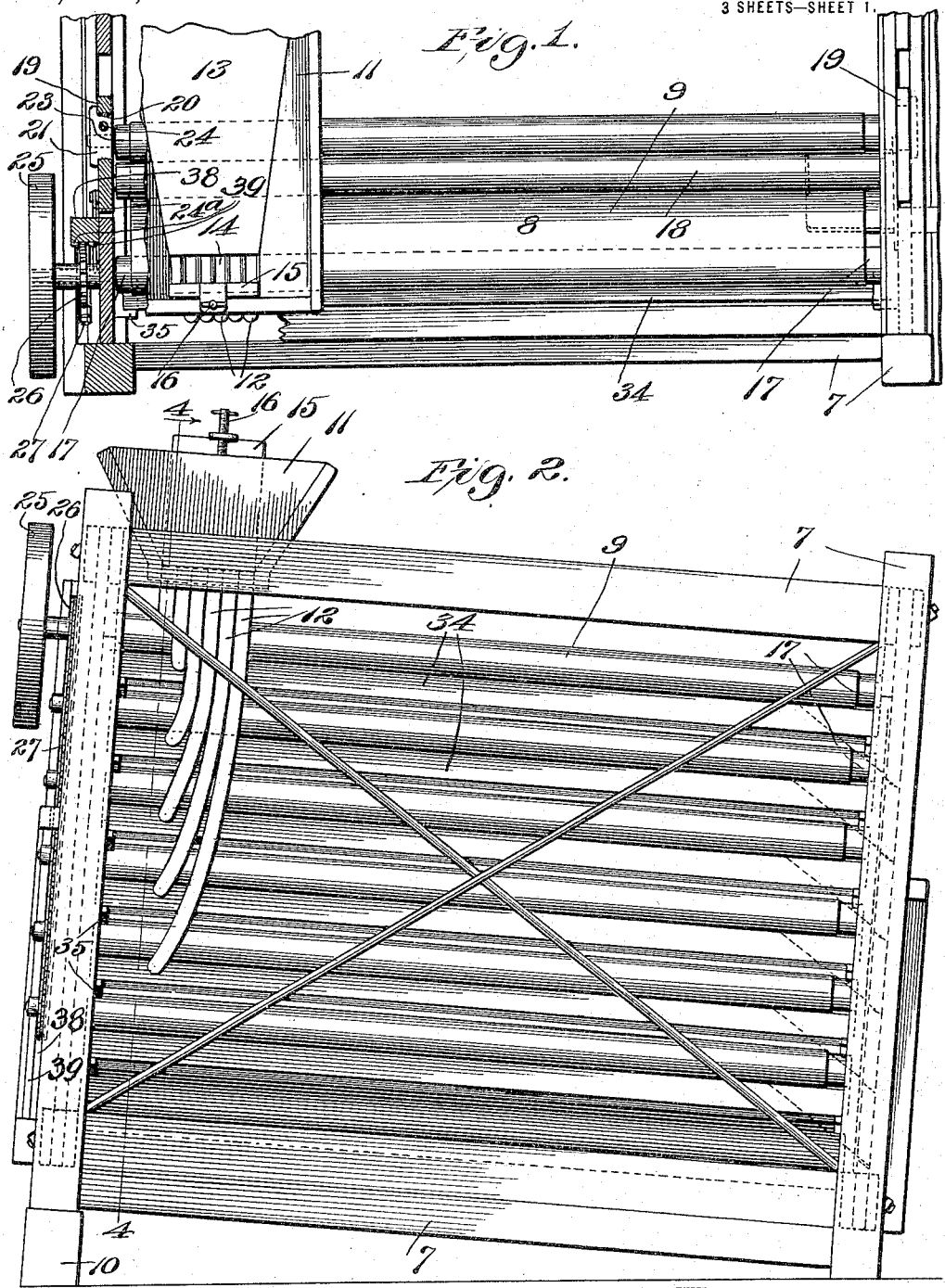

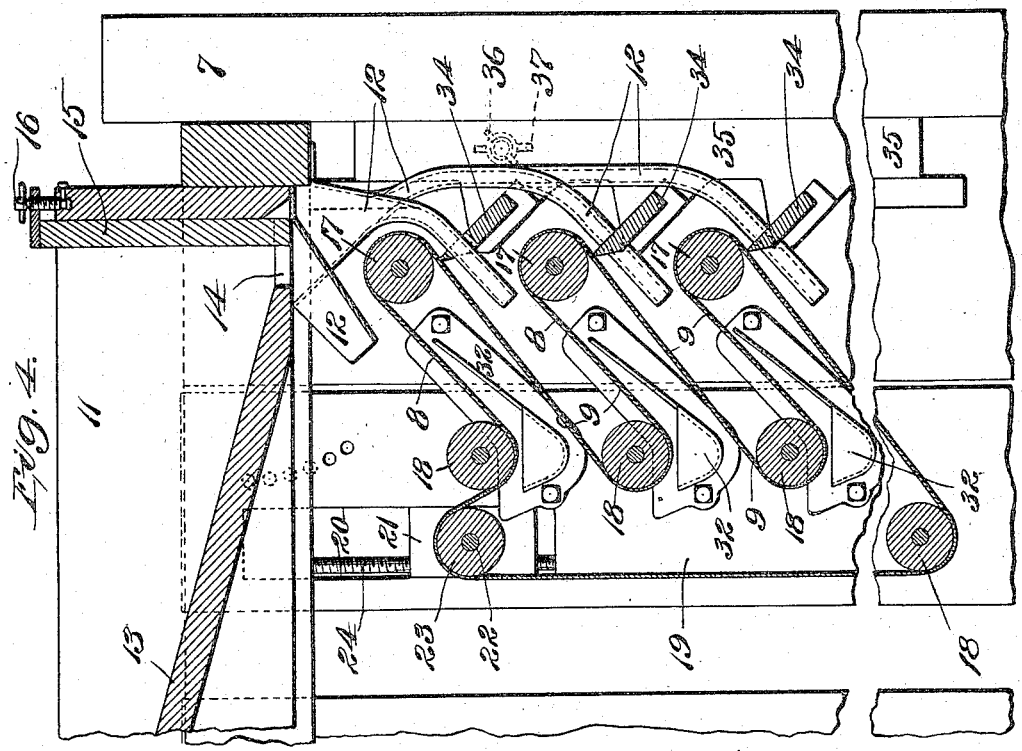

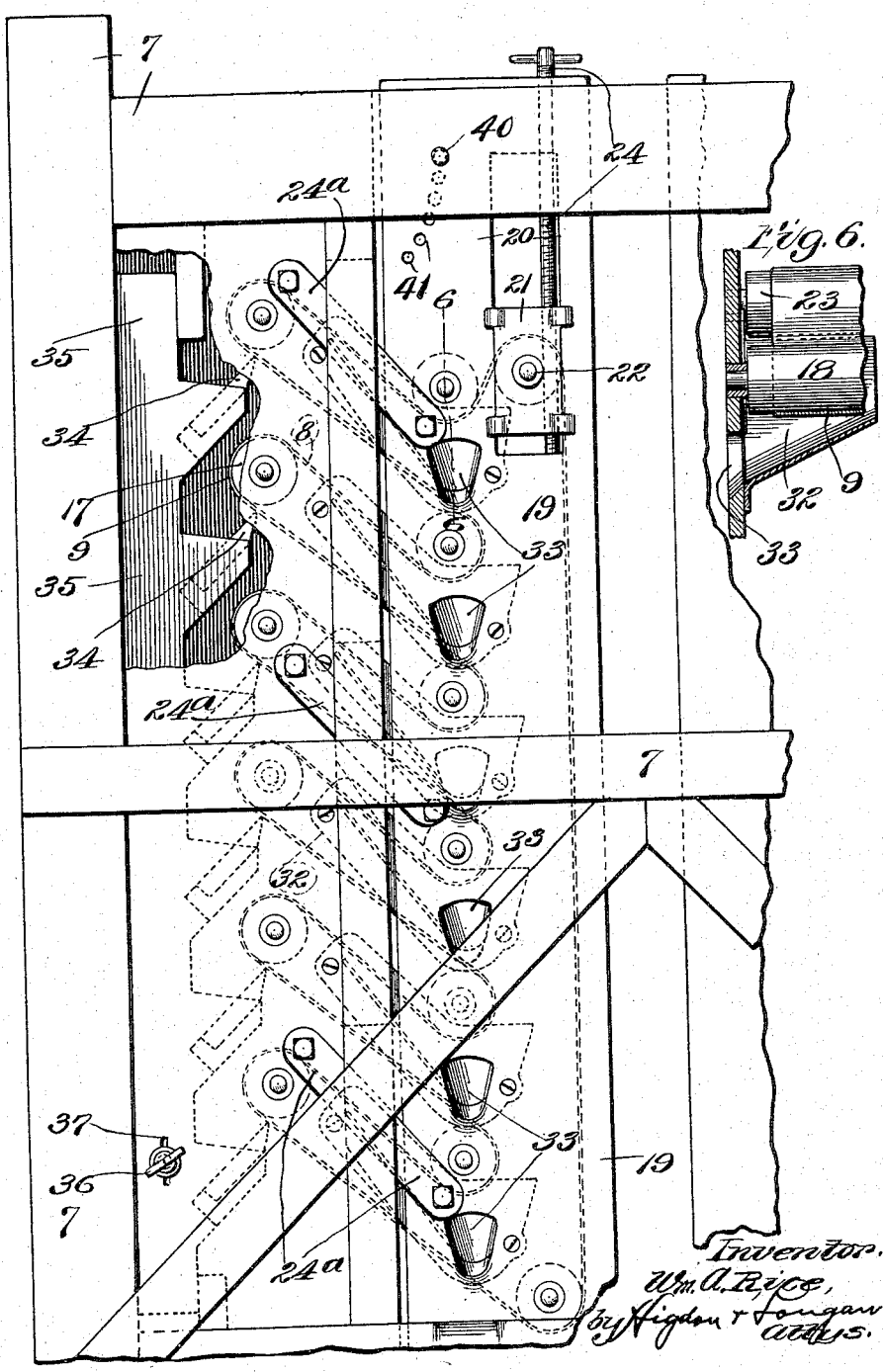

WILLIAM A. RICE, OF JERSEYVILLE, ILLINOIS.

GRAIN AND SEED SEPARATOR AND CLEANER.

1,168,550.  Specification of Letters Patent.  Patented Jan. 18, 1916.

Application filed June 21, 1915. Serial No. 35,306.

*To all whom it may concern:*

Be it known that I, WILLIAM A. RICE, a citizen of the United States, and resident of Jerseyville, Illinois, have invented certain new and useful Improvements in Grain and Seed Separators and Cleaners, of which the following is a specification, containing a full, clear, and exact description, reference being had to the accompanying drawings, forming a part hereof.

My invention relates to an improved grain and seed separator and cleaner, and consists in the novel construction hereinafter described and specifically designated in the appended claims.

The object of my invention is to provide an improved grain and seed separator and cleaner which shall be of ample capacity and yet not occupy a great space, and which shall be more efficient than machines heretofore known to me.

In the drawings: Figure 1 is a sectional plan view of a portion of my improved machine; Fig. 2 is a side view of the same; Fig. 3 is an end view; Fig. 4 is a vertical section taken on the line 4—4 of Fig. 2; Fig. 5 is an elevation of the tail end of the machine; and Fig. 6 is a detail showing the construction of the delivery spouts, the section being taken on the line 6—6 of Fig. 5.

Referring by numerals to the accompanying drawings: 7 indicates a suitable rectangular frame in which the mechanism is mounted, and this frame is tipped or inclined from its feed end toward the tail end, as shown in Fig. 2, for the purpose of feeding the globular seed or grain on the endless inclined sections 8 of the canvas belt 9, as said seed or grain progresses on said sections from the feed end to the tail end of the machine. In the present instance the inclination of the frame is accomplished by placing upon the floor beneath one end of the machine a suitable block 10.

The numeral 11 indicates a feed hopper located at the top of the machine at the elevated end thereof, to which the grain or seed is fed from any suitable source and from which said material passes through a series of individual feed chutes 12 to a point directly above the upper end of the inclined cleaning sections 8 of the said endless canvas belt 9. The said feed hopper 11 is provided with the usual inclined bottom 13, leading to a feed opening 14 controlled by the usual feed gate 15. The usual adjusting screw 16 is provided for securing the said feed gate at the desired adjustment. The said inclined belt sections 8 are arranged by mounting the said endless belt 9 on a series of rolls 17, having stationary bearings at opposite ends of the said frame, and passing them back and forth in zigzag form over another series of rolls 18, which are mounted upon a movable section 19 at both ends of said frame. Mounted in guides 20 in said movable sections 19 at each end of the frame are adjusting blocks 21, in which the journals 22 of a tightening roll 23 are mounted. Said tightening roll is adjusted by moving a screw 24, to raise or lower said blocks 21 carrying said tightening roll 23, for the purpose of tightening or loosening said endless belt 9. Said movable sections 19 are connected to the said frame by parallel links 24ª, so that when said sections 19 are moved for the purpose of changing the incline of the said belt sections 8, the said links 24ª will cause the said belt to remain at the same tension during various adjustments or inclinations of the said sections, as required for operation upon different kinds of seed and grain.

The numeral 25 indicates a drive pulley carrying on its shaft a sprocket wheel 26, over which runs a sprocket chain 27, which engages the teeth of a series of sprocket wheels 28, fixed upon the projecting journals of the said rolls 17, so that all of the said sprocket wheels of the vertical series of rolls 17 will be simultaneously driven in the same direction by the said sprocket chain.

30 indicates an idler pulley mounted upon a stud 31 near the said sprocket wheel 26, and over which idler the said sprocket chain 27 extends for the purpose of holding said chain out of contact with the teeth of the said series of sprocket wheels immediately beneath said idler.

The numeral 32 indicates a series of parallel "link-spouts", which are hinged at each end by means of suitable bolts or screws to the said movable section 19 and to the adjacent part of said frame 7, at the tail-end of the machine, in the space directly beneath each of the said belt-sections 8, to receive the cleaned and separated seed and grain, at the tail-end of said sections, and to discharge the said seed and grain through openings 33, from which the cleaned and separated seed and grain may be carried by spouts (not shown), or by any other suitable means. The ends of said "link spouts" which are carried by the said movable section 19, of course move up and down with the latter when said sections are adjusted for the purpose of changing the inclination of the said belt-sections 8, in adapting said sections for cleaning and separating seed and grain of various kinds.

The numeral 34 indicates a series of scrapers carried by a vertical frame 35, which is adjustable by means of thumb-screws 36 passed through slots 37 formed in said adjustable frame 35 and engaging a part of the fixed frame of the machine, and which scrapers loosely engage the under surface of each of the said inclined belt-sections 8, to remove therefrom any seed, grain, or other material, which may adhere to said sections after they have passed over the said rolls 17.

A vertical chain-guide 38, having parallel metal (or wood) guide-strips 39, is fixed on the said frame 7, at one side of said sprocket-chain 27, for the purpose of guiding said chain and holding its links in engagement with the teeth of all the sprocket-wheels 28, the links of said chain passing between the said parallel guide-strips 39, during operation of the machine. The said movable section 19, are held in the desired position, after adjustment to change the degree of inclination of the said belt-sections 8, by means of a common pin or bolt 40 and a series of holes 41, located near the upper end of said sections; said pin or bolt being passed through the desired holes in the frame 7 and in the said movable sections, as required to impart more or less inclination to the said sections.

The operation of my improved machine will be obvious to persons skilled in the art of seed and grain cleaning and separating.

What I claim is the following:

1. The improved seed separator and cleaner, comprising a suitable frame, a series of rolls mounted one above the other in fixed bearings carried by said frame, another series of rolls mounted one above the other in bearings which may be moved up or down simultaneously, an endless-belt mounted on said rolls and extending in a zigzag manner from said rolls which are mounted in fixed bearings to said rolls which have simultaneously movable bearings, means for imparting motion to said rolls in fixed bearings, means for feeding grain or seed to said endless-belt, and means for tightening said belt.

2. In a seed and grain separating and cleaning machine, an endless belt, a series of rolls on which said belt is mounted in zigzag sections inclined in the direction of their movement, means for raising and lowering like edges of all said sections simultaneously, a scraper-frame, a series of scrapers carried by said scraper-frame, one scraper of said series being located to engage beneath each of said sections, to remove adhering particles from said endless belt, and means for adjusting said scraper-frame.

In testimony whereof, I have signed my name to this specification, in presence of two subscribing witnesses.

WILLIAM A. RICE.

Witnesses:
 E. L. WALLACE,
 JOHN C. HIGDON.

Copies of this patent may be obtained for five cents each, by addressing the "Commissioner of Patents, Washington, D. C."